(12) United States Patent
Biberstein et al.

(10) Patent No.: US 7,574,697 B2
(45) Date of Patent: Aug. 11, 2009

(54) TESTING PARALLEL APPLICATIONS USING CODE INSTRUMENTATION

(75) Inventors: Marina Biberstein, Qiryat Mozkin (IL);
Eitan Farchi, Pardes Hanna (IL);
Yarden Nir, Haifa (IL); Shmuel Ur,
D.N. Misgav (IL)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 10/438,272

(22) Filed: May 14, 2003

(65) Prior Publication Data
US 2004/0230961 A1 Nov. 18, 2004

(51) Int. Cl.
*G06F 9/44* (2006.01)
(52) U.S. Cl. ...................................... 717/130
(58) Field of Classification Search ................. 717/104, 717/148, 124–129, 130; 703/17, 22; 714/10, 714/15, 35–41
See application file for complete search history.

(56) References Cited

U.S. PATENT DOCUMENTS 5,758,061 A * 5/1998 Plum ........................... 714/35
6,851,075 B2 * 2/2005 Ur et al. ....................... 714/36
2003/0046029 A1 * 3/2003 Wiener et al. ............... 702/186

OTHER PUBLICATIONS

Edelstein et al., Multithreaded Java program test generation, IBM Systems Journal, vol. 11, No. 1, Nov. 2002, pp. 111-125.*
Satyavathi Malladi, "A Thread Debugger for Testing and Reproducing Concurrency Scenarios", Jan. 15, 2003, ITTC, slides p. 1-36.*
Choi, Jong-Deok, et al., "Deterministic Replay of Java Multithreaded Applications," SPDT 98 Welches OR USA, pp. 48-59.
Edelstein, O., et al., "Multithreaded Java Program Test Generation," IBM Systems Journal, vol. 41, No. 1, 2002, pp. 111-125.

* cited by examiner

*Primary Examiner*—Tuan Anh Vu

(57) ABSTRACT

A method for testing a computer program that includes software code arranged to be executed in multiple threads, including at least a first thread and one or more other threads. The method includes identifying an output statement in the first thread, running the software code so as to generate an output due to the output statement, and intervening in the program so that when the program is run, execution of the first thread is blocked prior to the output statement while the one or more other threads continue to execute. The output generated after intervening in the program is examined in order to detect a fault in the program.

33 Claims, 3 Drawing Sheets

TESTING PARALLEL APPLICATIONS USING CODE INSTRUMENTATION

FIELD OF THE INVENTION

The present invention relates generally to software testing, and specifically to testing of parallel software applications.

BACKGROUND OF THE INVENTION

Sequential software, which runs on a single platform in a single thread, executes in a deterministic order. In other words, given the same input, the sequence of statement execution is fixed and unvarying in repeated executions of the software.

In parallel software applications, on the other hand, the order of execution of program statements may vary from one run to the next. In the context of the present patent application and in the claims, parallel software includes any sort of multithreaded, concurrent, or distributed software, and may run on a single processor or on multiple processors. In parallel software, the sequence of statement execution is dependent, inter alia, on scheduler decisions, order of message arrival, synchronization mechanisms, and relative speed of hardware involved. Whereas in sequential software, the program output is uniquely determined by the inputs selected, in the case of parallel software, the outputs may depend not only on the input space of the program, but also on the order in which different tasks are performed. The set of information that describes a sequence in which a parallel program executes in a given execution run is called an interleaving. Faults in a parallel application, such as race conditions, may manifest themselves in one interleaving but not in others, making the task of debugging the application all the more difficult.

In response to this difficulty, testing tools for parallel applications have been developed that are based on adding "noise" to the application. The noise changes the timing of the application, in an attempt to expose timing bugs that arise when an implementation does not consider a specific interleaving in which a fault is manifested. For example, Edelstein et al. describe a tool of this sort, known as "ConTest," for detecting synchronization faults, in an article entitled "Multithreaded Java Program Test Generation," IBM Systems Journal 41:1 (2002), pages 111-125. A Java™ application program under test is seeded with a sleepy, yield( ) or priority( ) primitive at shared memory accesses and synchronization events. At run time, ConTest makes random or coverage-based decisions as to whether the seeded primitive is to be executed. The probability of finding concurrent faults is thus increased. A replay algorithm facilitates debugging by saving the order of shared memory accesses and synchronization events. A suitable replay algorithm for this purpose is described by Choi et al., in "Deterministic Replay of Java Multithreaded Applications," Proceedings of the SIGMETRICS Symposium on Parallel and Distributed Tools (ACM, New York 1998), pages 48-59.

SUMMARY OF THE INVENTION

The present invention provides improved tools for detecting faults in parallel software programs, based on an adversarial approach that attempts to induce failures at such points. Embodiments of the present invention are described herein with particular reference to multithreaded Java applications, but the principles of the present invention may similarly be applied to concurrent, distributed and multithreaded programs of other sorts, as well. The term thread, as used in the present patent application and in the claims, should therefore be understood broadly to refer to any sequence of program statements that is executed in order by a processor, in a computing environment in which multiple sequences (threads) of this sort are executed in parallel as part of a single program. Thus, for example, in the present context, threads also include entities that are commonly referred to as processes and tasks. The software program under test may be designed for execution on a single processor or on a group of parallel processing nodes.

In embodiments of the present invention, a parallel application under test is executed, and the locations of output statements in the application are logged. The application code prior to each of these output statements is then instrumented in order to delay the timing of the output statements, and the application is executed again. In other words, if an output statement occurs in one thread of the application, instrumentation of the code causes that thread to be stopped, while the other threads are allowed to proceed. The other threads typically proceed as far as possible, until a point is reached at which the stopped thread is the only one that can run (and therefore must be allowed to continue). The execution of the instrumented code is logged, as well, and any differences in the outputs from those logged in the original execution run are noted. Thus, if there are different interleavings of the application program that generate different outputs even interleavings with a very low probability of occurring in practice they will be uncovered by the tools provided by the present invention.

Embodiments of the present invention can also be used in testing software that may have multiple correct outputs. In this case, the different outputs generated by execution of the instrumented code may be checked against a set of valid outputs, rather than just against the original output generated by the non-instrumented code. Alternatively or additionally, instrumentation of the application as provided by the present invention may be used to facilitate testing of a particular execution sequence, among multiple possible execution sequences of the application, by delaying other execution sequences so that the sequence of interest can execute.

Although the embodiments described herein are based mainly on techniques of software instrumentation, other types of user exit implementation may likewise be used to intervene in the program in order to block certain program threads. Such alternative thread-blocking techniques are also considered to be within the scope of the present invention.

There is therefore provided, in accordance with an embodiment of the present invention, a method for testing a computer program that includes software code arranged to be executed in multiple threads, including at least a first thread and one or more other threads, the method including:

identifying an output statement in the first thread;

running the software code so as to generate an output due to the output statement;

intervening in the program so that when the program is run, execution of the first thread is blocked prior to the output statement while the one or more other threads continue to execute; and examining the output generated after intervening in the program in order to detect a fault in the program.

Identifying the output statement typically includes running the program without intervening in the program, and logging the output of the program in order to locate the output statement. Examining the output may include comparing the output generated after intervening in the program to the output logged before intervening in the program, and detecting a difference in the output.

Additionally or alternatively, examining the output includes comparing the output to a set of allowed outputs, and detecting the fault when the output is not a member of the set.

In embodiments of the invention, intervening in the program includes instrumenting the software code. Typically, identifying the output statement includes identifying multiple output statements in one or more of the threads including at least the first thread, and instrumenting the software code includes inserting a respective code instruction prior to each of the identified output statements.

Additionally or alternatively, instrumenting the software code includes blocking the first thread so that the execution of the first thread will resume only when none of the multiple threads, other than the first thread, is able to continue to execute. In disclosed embodiments, blocking the first thread includes inserting at least one of a sleep( ) statement and a yield( ) statement in the first thread prior to the output statement.

In one embodiment, instrumenting the software code includes inserting a code instruction to block the first thread at a location in the software code immediately prior to the output statement. In another embodiment, the output includes a value of a variable that is set at an assignment statement preceding the output statement in the first thread, and instrumenting the software code includes inserting a code instruction to block at least one of the first thread and the other threads at a location in the software code between the assignment statement and the output statement. In a further embodiment, identifying the output statement includes identifying a block in the first thread that begins with an enter block statement and contains the output statement, and instrumenting the software code includes inserting a code instruction to block the first thread prior to the enter block statement.

The multiple threads may include at least one of a process and a task, and running the software code may include running the software code on multiple processing nodes in parallel.

There is also provided, in accordance with an embodiment of the present invention, a method for testing a computer program that includes software code arranged to be executed in multiple threads and having multiple possible execution flows, which are characterized by respective sequences of outputs, the method including:

selecting a desired execution flow, characterized by a desired sequence of outputs, from among the multiple possible execution flows;

running the software code;

intervening in the program so that when the program is run, execution of the threads leading to the outputs that are not in the desired sequence is blocked, while one or more of the threads continue to execute in the desired execution flow; and testing the desired execution flow while running the software code after intervening in the program.

In one embodiment, intervening in the program includes instrumenting the software code by inserting program statements in the threads leading to the outputs that are not in the desired sequence so that the execution of the threads leading to the outputs that are not in the desired sequence will resume only when none of the one or more of the threads is able to continue to execute in the desired execution flow.

There is additionally provided, in accordance with an embodiment of the present invention, apparatus for testing a computer program that includes software code arranged to be executed in multiple threads, including at least a first thread and a one or more other threads, the apparatus including at test workstation, which is arranged to identify an output statement in the first thread, and to intervene in the program so that when the program is run, execution of the first thread is blocked prior to the output statement while the one or more other threads continue to execute, the workstation being further arranged to run the software code so as to generate an output due to the output statement, wherein the output is indicative of a fault in the program. 33. There is further provided, in accordance with an embodiment of the present invention, apparatus for testing a computer program that includes software code arranged to be executed in multiple threads and having multiple possible execution flows, which are characterized by respective sequences of outputs, the apparatus including a test workstation, which is arranged to select a desired execution flow, characterized by a desired sequence of outputs, from among the multiple possible execution flows, and to intervene in the program so that when the program is run, execution of the threads leading to the outputs that are not in the desired sequence is blocked, while one or more of the threads continue to execute in the desired execution flow, so that upon running the software code, the desired execution flow is tested.

There is moreover provided, in accordance with an embodiment of the present invention, a computer software product for testing an application program that includes software code arranged to be executed in multiple threads, including at least a first thread and one or more other threads, the product including a computer-readable medium in which program instructions are stored, which instructions, when read by a computer, cause the computer to identify an output statement in the first thread, and to intervene in the program so that when the application program is run, execution of the first thread is blocked prior to the output statement while the one or more other threads continue to execute, the instructions further causing the computer to run the software code so as to generate an output due to the output statement, wherein the output is indicative of a fault in the program.

There is furthermore provided, in accordance with an embodiment of the present invention, a computer software product for testing a computer program that includes software code arranged to be executed in multiple threads and having multiple possible execution flows, which are characterized by respective sequences of outputs, the product including a computer-readable medium in which program instructions are stored, which instructions, when read by a computer, cause the computer to select a desired execution flow, characterized by a desired sequence of outputs, from among the multiple possible execution flows, and to intervene in the program so that when the program is run, execution of the threads leading to the outputs that are not in the desired sequence is blocked, while one or more of the threads continue to execute in the desired execution flow, so that upon running the software code, the desired execution flow is tested.

The present invention will be more fully understood from the following detailed description of the embodiments thereof, taken together with the drawings in which:

DETAILED DESCRIPTION OF EMBODIMENTS

Figure 1:
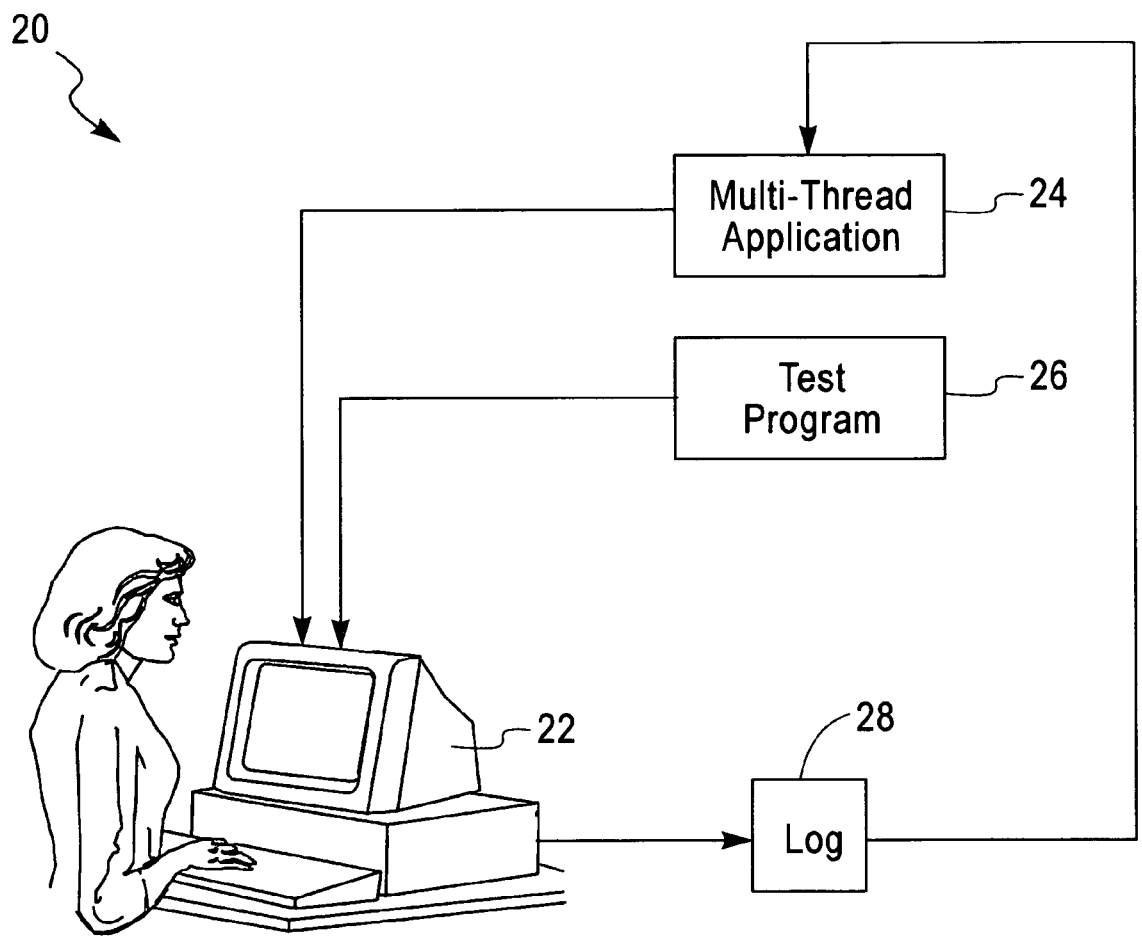
FIG. 1 is a schematic, pictorial illustration of a system for software testing, in accordance with an embodiment of the present invention.

FIG. 1 is a schematic, pictorial illustration of a system 20 for software testing, in accordance with an embodiment of the present invention. System 20 is built around a test workstation 22, typically a general-purpose computer with suitable software for carrying out the functions described hereinbelow. This software may be downloaded to workstation 22 in electronic form, over a network, for example, or it may alternatively be furnished on tangible media, such as CD-ROM. The software test functions 10 of the present invention may be combined in system 20 with other testing tools, such as the above-mentioned ConTest tool and race detection functions described in U.S. patent application Ser. No. 10/035,422, filed Jan. 4, 2002, now issued as U.S. Pat. No. 6,851,075, which is assigned to the assignee of the present patent application and whose disclosure is incorporated herein by reference.

System 20 is designed to receive and test a parallel software application 24. In the present example, application 24 is assumed to comprise a multithreaded Java application, which may be provided in source code or byte code form. A test program 26, which is also typically written in Java as either a single-threaded or multithreaded program, is used to run application 24 with a given set of inputs and execution conditions. The execution of the test is recorded in a log 28, including all outputs generated by the application. The logged results are used in instrumenting the code of application 24 for further testing, as described below. The log may also be used to hold and replay the order of memory access and synchronization events, to aid in debugging application 24 when faults are found. This replay function may be carried out using the algorithm described by Choi et al. in their above-mentioned article, or using other tools known in the art, such as the Rational Robot, offered by Rational Software (Cupertino, Calif.).

Figure 2:
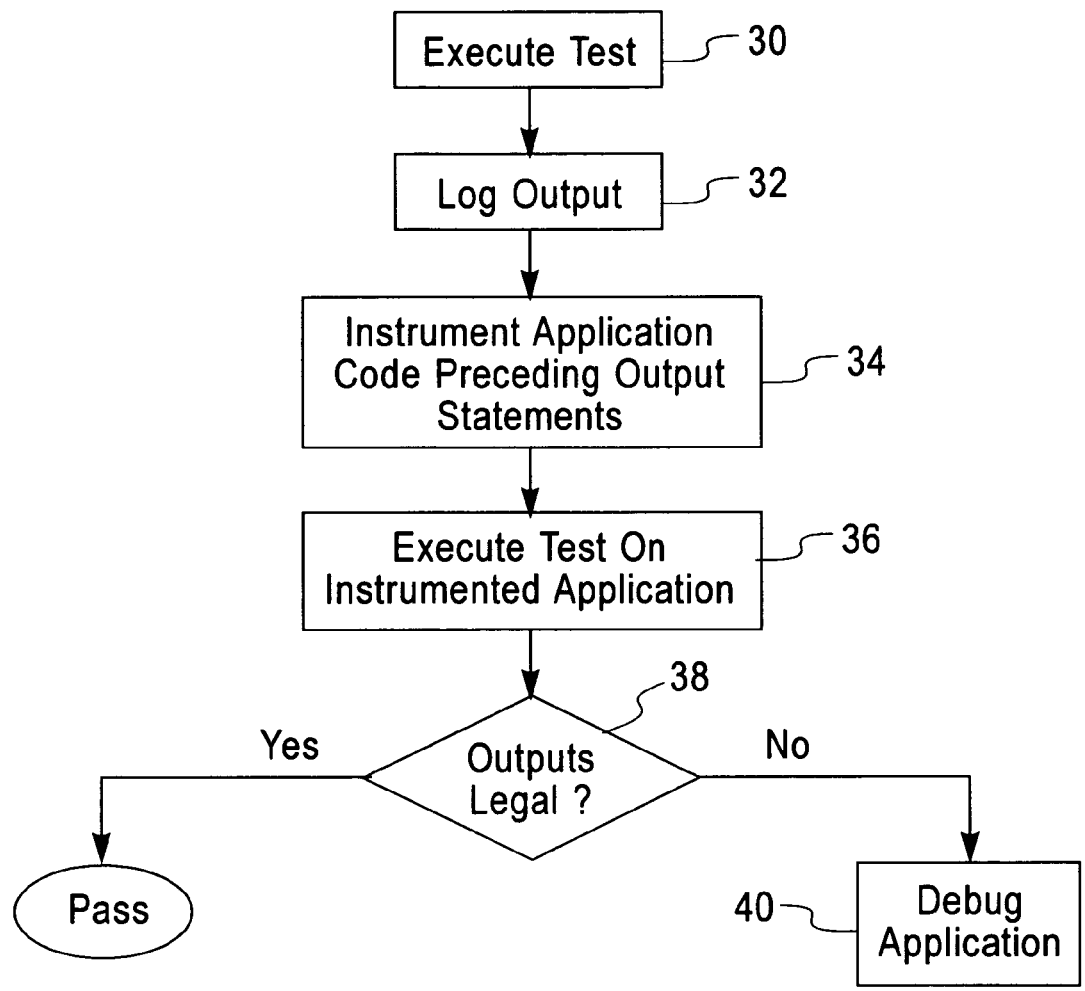
FIG. 2 is a flow chart that schematically illustrates a method for testing a software application, in accordance with an embodiment of the present invention.

FIG. 2 is a flow chart that schematically illustrates a method for testing application 24, in accordance with an embodiment of the present invention. Initially, workstation 22 executes multithreaded application 24 using test program 26, at an initial execution step 30. The results of the test are recorded in log 28, at a logging step 32, including the locations of all output statements in application 24. Workstation 22 then automatically instruments the code of application 24 (typically the Java byte code) prior to each output statement, at an instrumentation step 34. The purpose of this instrumentation is to delay the thread containing the output statement for as long as possible, typically until the stopped thread is the only one that can still run. Various different methods may be used to induce the desired delay. Some exemplary methods are described below.

After instrumenting the code, workstation 22 runs application 24 again, using test program 26, at a repeat execution step 36. The outputs of the application are again recorded in log 28. The workstation checks these outputs, at an output checking step 38. If application 24 is supposed to give a unique sequence of outputs (for the particular set of inputs specified by test program 26), then it is sufficient at step 38 to check the outputs of the instrumented application against the outputs originally logged at step 32. The application is considered to have passed the test if the outputs are unchanged by the instrumentation. Otherwise, the application is debugged, typically by the programmer who created it, in order to remove the timing fault that caused the inconsistent outputs at a debugging step 40.

Alternatively, in some applications, the expected output sequence for a given set of inputs may not be unique. In this case, workstation 22 may need to resort to an oracle a program (possibly created by a human expert) capable of determining which output sequences are correct. Variations in the output sequences permitted by the oracle typically include certain reorderings of the outputs, without changes in their values, but the variations may also include changes in the output values themselves. In either case, the oracle is preferably capable of verifying, for any sequence of outputs, whether or not the sequence belongs to the set of legal outputs of the test applied by test program 26.

Figure 3:
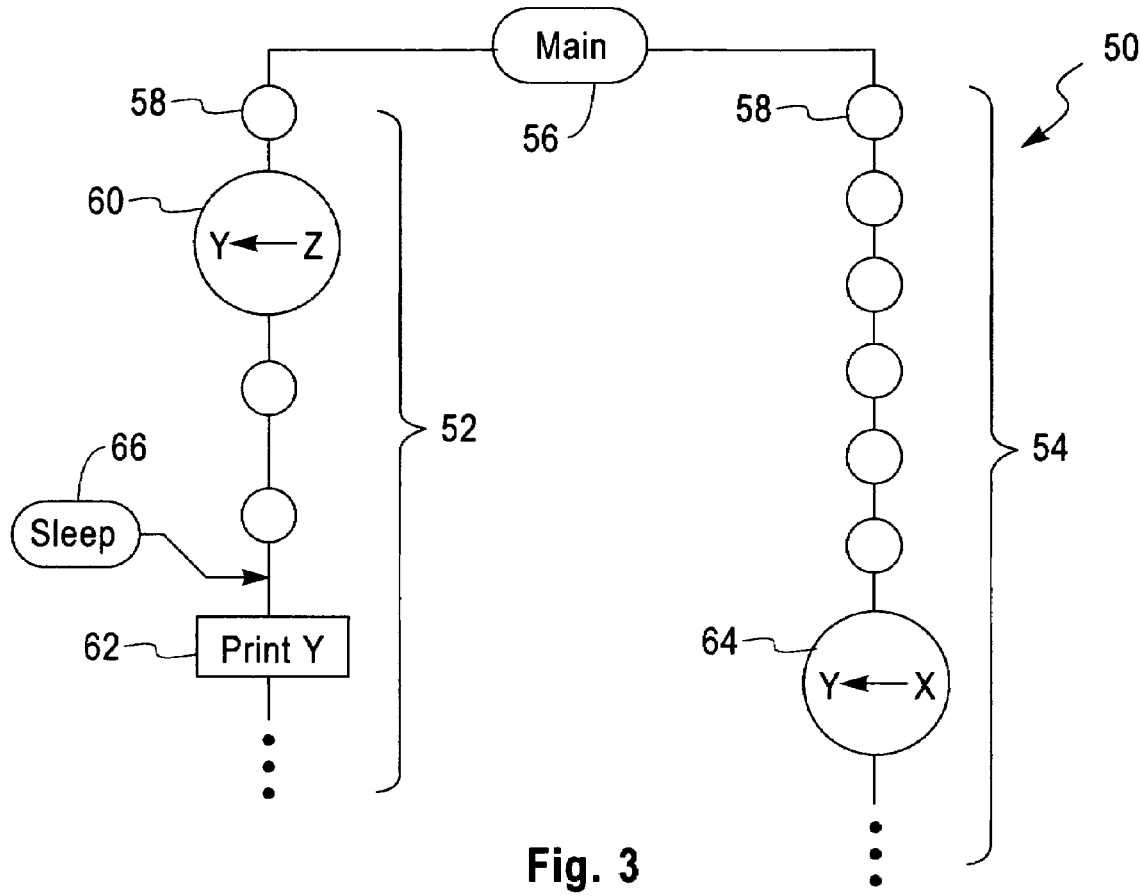
FIG. 3 is a graph that schematically illustrates an execution sequence of a multithreaded software application under test, in accordance with an embodiment of the present invention.

FIG. 3 is a graph that schematically illustrates the order of execution of a multithreaded software application 50 under test in system 20, in accordance with an embodiment of the present invention. The application comprises two threads 52 and 54, which are initiated by a main program 56 and comprise respective sequences of program statements 58. At a first assignment statement 60 in thread 52, a variable Y is assigned the value Z. Under ordinary operating conditions, an output statement 62 (PRINT Y) in thread 52 will cause the application to output the value Z. Later on, a second assignment statement 64 in thread 54 will assign Y the value X. It can be seen in FIG. 3 that if thread 52 is delayed between statements 60 and 62, statement 62 will cause the application to output the value X, but this fault may not have been detected by the application programmer.

Therefore, in order to reveal the faulty behavior of application 50, workstation 22 instruments the application program at step 34 in order to delay statement 62 for as long as possible. The code instrumentation can be expressed in pseudocode form as follows:

```
Halting thread::
    otherAdvancing = true
    While(otherAdvancing) {otherAdvancing = false;
        sleep(duration) };
Other threads execute:
    otherAdvancing = true;
```

In a simple implementation shown in FIG. 3, a sleep( ) statement 66 is added to the program just before step 62. Statement 66 causes thread 52 to be blocked until thread 54 (as well as any other threads in the program) is blocked or finishes its execution. (This implementation of sleep( ) differs from that described in the above-mentioned article by Edelstein et al., in which the sleep( ) statement causes a thread to be blocked for a randomly selected period of time.) Alternatively, a yield( ) statement may be used at statement 66 (in place of sleep( )), in order to pass control from thread 52 to thread 54. Assuming there is no point in thread 54 prior to statement 64 at which thread 54 will be blocked while waiting for thread 52 to execute, the addition of statement 66 to thread 52 will cause the unexpected value X to be printed at statement 62.

Alternatively, it may be desirable to use a more complex implementation at step 34, since by the time the program flow reaches output statement 62 in step 36, it may be too late to actually change the output order. Thus, statement 66 may be introduced in thread 52 at some other stage, for example, directly following the last point in thread 52 before output statement 62 at which variable Y is set (i.e., just after assignment statement 60), or intermediate between the assignment and output statements. Program analysis techniques known in the art, such as program slicing, may be used to detect the instructions that precede the output statement. Program slicing is described, for example, by Lev-Ami et al., in "Putting Static Analysis to Work for Verification: A Case Study," in Proceedings of the ACM International Symposium on Software Testing and Analysis (ISSTA) (2000), pages 26-38.

Although in the simplified example shown in FIG. 3, assignment statement 60 is in the same thread 52 as output statement 62, in other cases the assignment and output statements may belong to different threads. In such cases, the thread containing the assignment may be blocked before the assignment is executed (so that it may remain blocked until after the output occurs), or the thread containing the output statement may be blocked at the statement that it happens to have reached the assignment executes. Even more generally, it is possible to identify a set of statements on which the output depends, directly or indirectly, in whatever thread these statements occur, and block this thread before the assignment, or block one of its dependent threads.

As another example, two different threads that are synchronized on the same object will be mutually exclusive, so that whichever thread is first to acquire a lock on the object will execute first. In order to change the order of execution, workstation 22 may search at step 34 for an enter block statement, such as the Java byte code statement monitorenter(obj), in the thread that executed first at step 30 (wherein obj is the synchronization object of the two threads). A sleep( ) or other delay statement may then be instrumented into the code before the enter block statement in order to force a change in the thread execution order.

Other methods for delaying a thread prior to an output statement will be apparent to those skilled in the art and are considered to be within the scope of the present invention.

Figure 4:
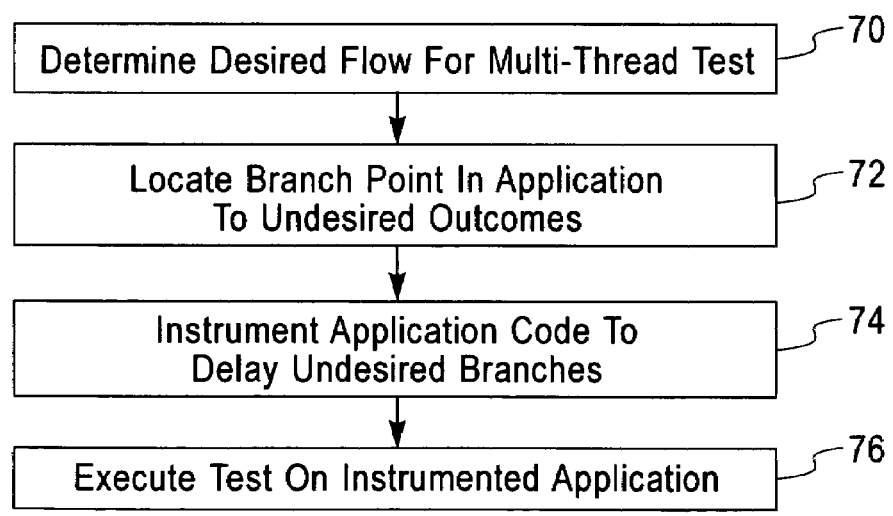
FIG. 4 is a flow chart that schematically illustrates a method for testing a software application, in accordance with an alternative embodiment of the present invention.

FIG. 4 is a flow chart that schematically illustrates a method for testing application 24, in accordance with an alternative embodiment of the present invention. This embodiment uses the principles of the present invention in a different way not to induce failure in testing a parallel application, but rather to cause a test of the application to follow a certain desired execution path (which may result either in successful execution or failure). This feature of the present invention is useful, for example, in conjunction with test generation tools, such as the GOTCHA-TCBeans Software Test Tool Kit, developed by International Business Machines Corporation (Armonk, N.Y.). Tools of this sort attempt to predict the sequence of states or events that a program under test will traverse, and then automatically create tests to evaluate the program, assuming the program follows this predicted sequence. When multiple legal execution sequences are possible, however, the actual execution of the program may not follow the predicted sequence, and the tests therefore will not give useful results.

To prevent this eventuality, workstation 22 analyzes test program 26 to determine the desired execution flow of application 24 under test, at a flow analysis step 70. The test program may be supplied by a human user, such as a test engineer, or alternatively, it may be created by an automated test generation tool, as mentioned above. For example, assume that the sequence of outputs that may be generated by application 24 is A→B→ (C,D,E) and C→F. In other words, output A is followed by output B, which may legally be followed by any of outputs C, D and E. If output C occurs, it is expected to be followed by output F. The desired execution flow under test program 26 is assumed to be the sequence A→B→C→F. Although outputs D and E are legal, they are not desirable in the framework of test program 26.

To facilitate successful execution of the test, workstation 22 locates branch points in application 24 statements in the threads of the application that lead to outputs D and E, at a branch location step 72. The workstation then instruments application 24, in a manner similar to that described above, in order to delay the threads that lead to these undesired outputs, at a thread delay step 74. The workstation runs the instrumented application, using test program 26, at a test execution step 76. As a result of the instrumentation, the desired sequence A→B→C→F is observed and can be evaluated for success or failure.

Although the embodiments described hereinabove are based mainly on techniques of software instrumentation, other types of user exit implementation may likewise be used to intervene in the program in order to block selected program threads. For example, when an application program under test is executed using another program (such as a Java Virtual Machine—JVM), this other program may be modified to detect when a certain thread in the application program is running and to allow threads to be blocked. A technique known as wrapping may be used in a similar fashion, when the application program under test makes use of a synchronize system method. In this case, instead of instrumenting the application program code, a new synchronize method can be provided, which allows intervention in the program in addition to executing the system synchronize. (This technique of intervention is also known as overloading, although it is not known in the art to use wrapping or overloading for the purposes of the present invention.) Other methods for intervening in the control flow of an application, which can be used to block a selected thread, will be apparent to those skilled in the art and are considered to be within the scope of the present invention.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for testing a computer program that includes software code arranged to be executed in multiple threads, including at least a first thread and one or more other threads, the method comprising:

identifying an output statement in the first thread, wherein the output statement causes the computer program to output a value of a variable;

running the software code on a computer so as to generate a first output due to the output statement, corresponding to a first value of the variable in a first interleaving of the program;

instrumenting the software code by inserting an instruction between an assignment statement at which the first value is assigned to the variable and the output statement that generated the first output corresponding to the first value of the variable in the first thread, so that when the program is run, the instruction causes execution of the first thread to be blocked prior to the output statement while the one or more other threads continue to execute, and so that the execution of the first thread will resume only when none of the multiple threads, other than the first thread, is able to continue to execute, whereby a second output, different from the first output, can be observed due to the output statement as a result of a second interleaving of the program, different from the first interleaving;

examining the second output generated by the computer after intervening in the program in order to detect a fault in the program arising in the second interleaving; and debugging the software code so as to correct the fault.

2. The method according to claim 1, wherein identifying the output statement comprises running the program without intervening in the program, and logging the output of the program in order to locate the output statement.

3. The method according to claim 2, wherein examining the output comprises comparing the output generated after intervening in the program to the output logged before intervening in the program, and detecting a difference in the output.

4. The method according to claim 1, wherein examining the output comprises comparing the output to a set of allowed outputs, and detecting the fault when the output is not a member of the set.

5. The method according to claim 1, wherein identifying the output statement comprises identifying multiple output statements in one or more of the threads comprising at least the first thread, and wherein instrumenting the software code comprises inserting a respective code instruction prior to each of the identified output statements.

6. The method according to claim 1, wherein blocking the first thread comprises inserting at least one of a sleep( ) statement and a yield( ) statement in the first thread prior to the output statement.

7. The method according to claim 1, wherein instrumenting the software code comprises inserting a code instruction to block the first thread at a location in the software code immediately prior to the output statement.

8. The method according to claim 1, wherein identifying the output statement comprises identifying a block in the first thread that begins with an enter block statement and contains the output statement, and wherein instrumenting the software code comprises inserting a code instruction to block the first thread prior to the enter block statement.

9. The method according to claim 1, wherein the multiple threads comprise at least one of a process and a task.

10. The method according to claim 1, wherein running the software code comprises running the software code on multiple processing nodes in parallel.

11. A method for testing a computer program that includes software code arranged to be executed in multiple threads and having multiple possible execution flows, the method comprising:

running the software code on a computer so as to identify one or more respective sequences of outputs of the possible execution flows;

selecting a specific execution flow from among the multiple possible execution flows, wherein the specific execution flow is characterized by a specific sequence of the outputs identified by analyzing the execution flows due to running the software code;

instrumenting the software code by inserting program statements at locations that were found in running the software code to lead to the outputs that are not in the specific sequence of the outputs that was identified by analyzing the execution flows, so that when the program is rerun, the inserted program statements cause execution of the threads leading to the outputs that are not in the specific sequence to be blocked, while one or more of the threads continue to execute in the specific execution flow, whereby execution of the threads leading to the outputs that are not in the specific sequence will resume only when none of the threads in the specific execution flow is able to continue to execute; and testing the specific execution flow while rerunning the software code on the computer after instrumenting the software code.

12. The method according to claim 11, wherein instrumenting the software code comprises logging the outputs of the program in order to determine one or more locations at which the code should be instrumented.

13. The method according to claim 11, wherein the multiple threads comprise at least one of a process and a task.

14. The method according to claim 11, wherein running the software code comprises running the software code on multiple processing nodes in parallel.

15. A method for testing a computer program that includes software code arranged to be executed in multiple threads, including at least a first thread and one or more other threads, the method comprising:

identifying an output statement in the first thread;

running the software code on a computer so as to generate an output responsive to a value of a variable due to the output statement in the first thread;

intervening in the program by inserting an instruction between an assignment statement at which the value is assigned to the variable and the output statement that generated the output, so that when the program is run, execution of the first thread is blocked prior to the output statement in the first thread that generated the output, while the one or more other threads continue to execute, so that the execution of the first thread will resume only when none of the other threads, other than the first thread, is able to continue to execute;

examining the output generated by the computer after intervening in the program in order to detect a fault in the program; and debugging the software code so as to correct the fault.

16. The method according to claim 15, wherein identifying the output statement comprises running the program without intervening in the program, and logging the output of the program in order to locate the output statement.

17. The method according to claim 16, wherein examining the output comprises comparing the output generated after intervening in the program to the output logged before intervening in the program, and detecting a difference in the output.

18. The method according to claim 15, wherein examining the output comprises comparing the output to a set of allowed outputs, and detecting the fault when the output is not a member of the set.

19. The method according to claim 15, wherein intervening in the program comprises instrumenting the software code.

20. The method according to claim 19, wherein identifying the output statement comprises identifying multiple output statements in one or more of the threads comprising at least the first thread, and wherein instrumenting the software code comprises inserting a respective code instruction prior to each of the identified output statements.

21. The method according to claim 19, wherein instrumenting the software code comprises blocking the first thread so that the execution of the first thread will resume only when none of the multiple threads, other than the first thread, is able to continue to execute.

22. The method according to claim 21, wherein blocking the first thread comprises inserting at least one of a sleep( ) statement and a yield( ) statement in the first thread prior to the output statement.

23. The method according to claim 19, wherein instrumenting the software code comprises inserting a code instruction to block the first thread at a location in the software code immediately prior to the output statement.

24. The method according to claim 19, wherein the output comprises a value of a variable that is set at an assignment statement preceding the output statement in the first thread, and wherein instrumenting the software code comprises inserting a code instruction to block at least one of the first thread and the other threads at a location in the software code between the assignment statement and the output statement.

25. The method according to claim 19, wherein identifying the output statement comprises identifying a block in the first thread that begins with an enter block statement and contains the output statement, and wherein instrumenting the software code comprises inserting a code instruction to block the first thread prior to the enter block statement.

26. The method according to claim 15, wherein the multiple threads comprise at least one of a process and a task.

27. The method according to claim 15, wherein running the software code comprises running the software code on multiple processing nodes in parallel.

28. A method for testing a computer program that includes software code arranged to be executed in multiple threads and having multiple possible execution flows, which are characterized by respective sequences of outputs, the method comprising:

selecting a desired execution flow, characterized by a desired sequence of outputs, from among the multiple possible execution flows;

running the software code on a computer;

intervening in the program by inserting program statements at locations that were found to lead to outputs that are not in the desired sequence of the outputs in the selected execution flow, so that when the program is run, execution of the threads leading to the outputs that are not in the desired sequence of the outputs in the desired execution flow is blocked, while one or more of the threads continue to execute in the desired execution flow, whereby execution of the threads leading to the outputs that are not in the desired sequence will resume only when none of the threads in the selected execution flow is able to continue to execute; and testing the desired execution flow while running the software code on the computer after intervening in the program.

29. The method according to claim 28, wherein intervening in the program comprises instrumenting the software code.

30. The method according to claim 29, wherein instrumenting the software code comprises running the program before instrumenting the software code, and logging the outputs of the program in order to determine one or more locations at which the code should be instrumented.

31. The method according to claim 29, wherein instrumenting the software code comprises inserting program statements in the threads leading to the outputs that are not in the desired sequence so that the execution of the threads leading to the outputs that are not in the desired sequence will resume only when none of the one or more of the threads is able to continue to execute in the desired execution flow.

32. The method according to claim 28, wherein the multiple threads comprise at least one of a process and a task.

33. The method according to claim 28, wherein running the software code comprises running the software code on multiple processing nodes in parallel.

\* \* \* \* \*